Dec. 3, 1935.  H. SCHLACHTER  2,023,292
PRESSURE CONTROLLED WINDMILL REGULATOR
Filed June 16, 1930    3 Sheets-Sheet 1
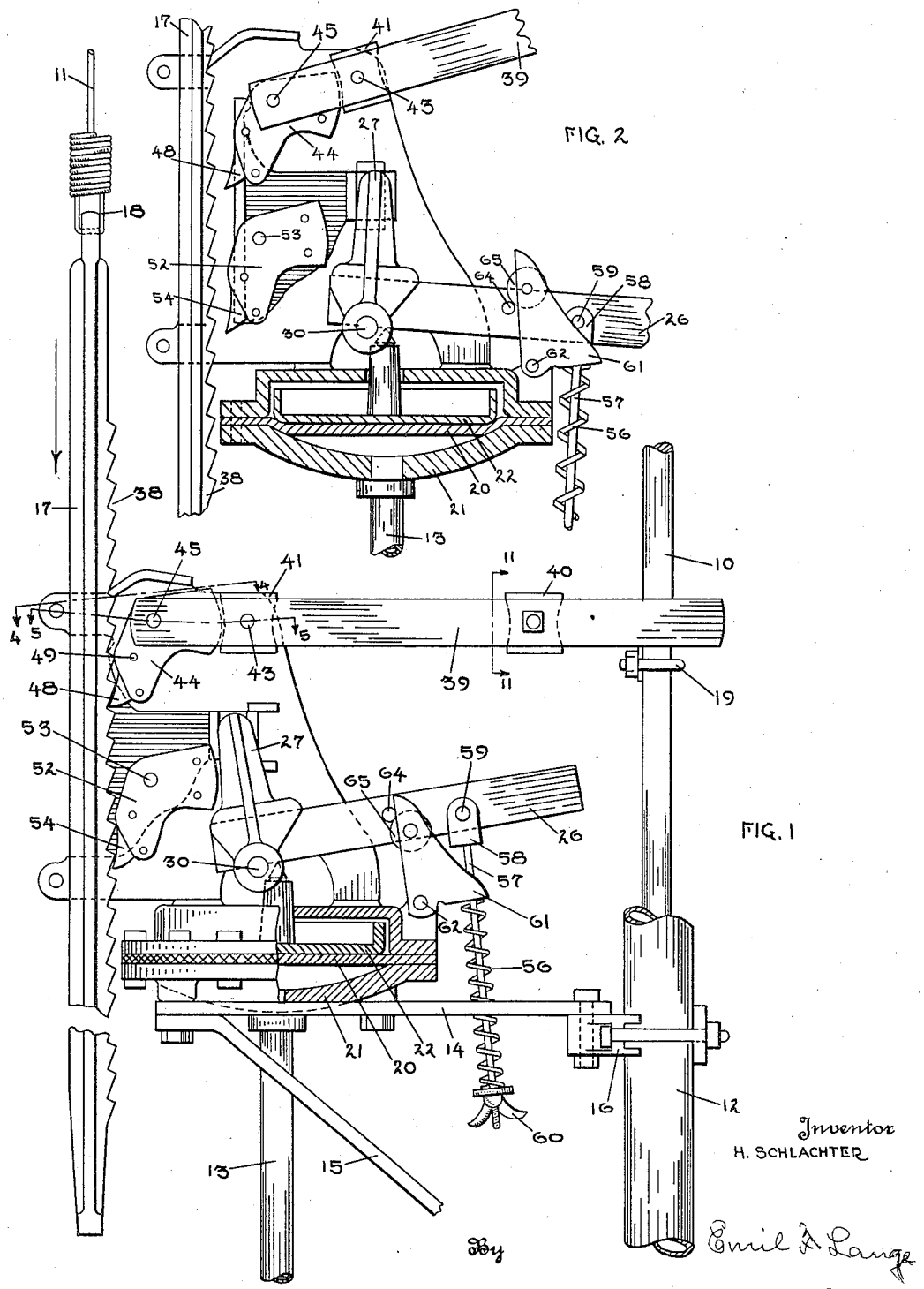
Inventor
H. SCHLACHTER
By Emil F. Lange
Attorney Dec. 3, 1935.  H. SCHLACHTER  2,023,292
PRESSURE CONTROLLED WINDMILL REGULATOR
Filed June 16, 1930    3 Sheets-Sheet 2
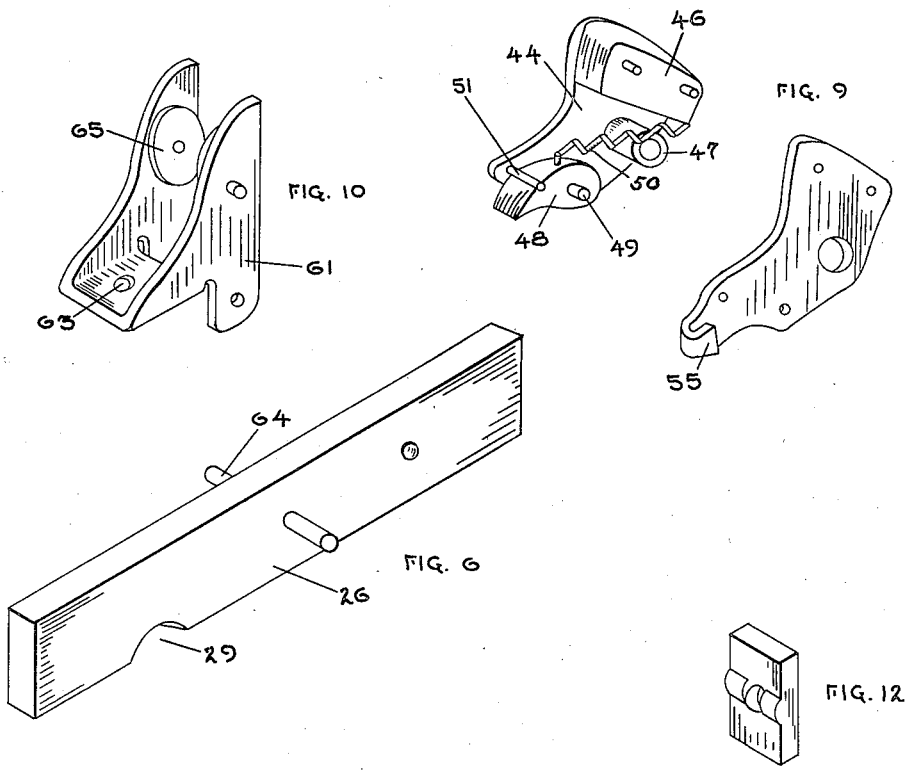
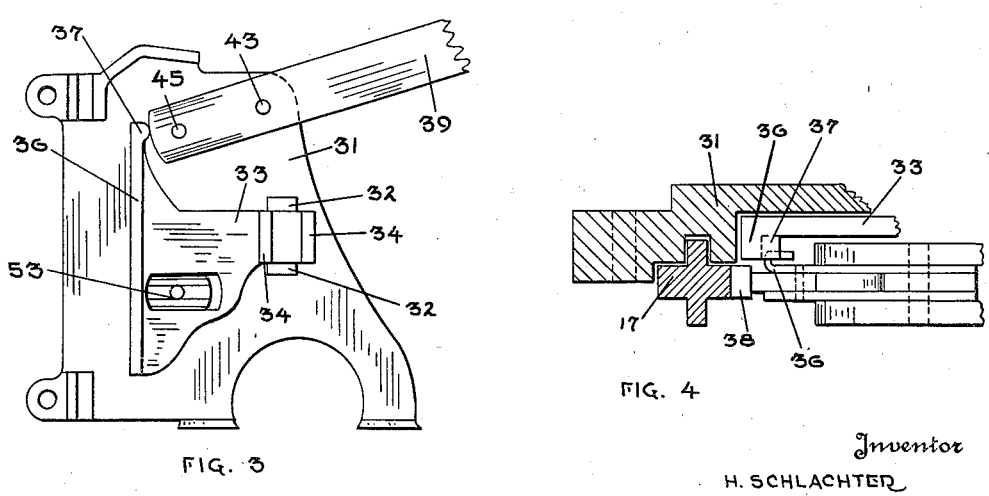
Inventor
H. SCHLACHTER
By Emil F. Lange
Attorney Dec. 3, 1935. H. SCHLACHTER 2,023,292
PRESSURE CONTROLLED WINDMILL REGULATOR
Filed June 16, 1930 3 Sheets-Sheet 3

Inventor
H. SCHLACHTER

Patented Dec. 3, 1935

2,023,292

UNITED STATES PATENT OFFICE 2,023,292

PRESSURE CONTROLLED WINDMILL REGULATOR

Henry Schlachter, Beatrice, Nebr., assignor to Dempster Mill Manufacturing Company, a corporation of Nebraska Application June 16, 1930, Serial No. 461,486

9 Claims. (Cl. 103—33)

My invention relates to pressure controlled windmill regulators, its object being the provision of a regulator which is responsive to variations in pressure within the pressure tank to automatically throw the windmill into and out of gear.

Another of my objects is the provision of a regulator having a diaphragm which is responsive to the variations in pressure in the pressure tank, the diaphragm being adapted to actuate the mechanism for throwing the windmill into and out of gear.

Another of my objects is the provision of a diaphragm with an opposing spring and with mechanism which is operable to throw the windmill into and out of gear.

Another of my objects is the provision of a diaphragm responsive to variations in pressure within the tank and with a spring acting in opposition to the diaphragm, the tension of the spring being adjustable.

Another of my objects is the provision of a diaphragm connected with a pressure tank so as to be responsive to variations in pressure in the tank, having also an opposing spring and mechanism operable by the diaphragm and the spring to throw a windmill into and out of gear, the diaphragm, spring and mechanism being so arranged that power is stored up in the diaphragm and spring for applying sudden impulses to the mechanism.

It is also my object to provide a windmill regulator which is simple in construction, which is not liable to get out of order and which is automatic for stopping the inflow of water into a pressure tank when the pressure reaches a predetermined maximum and for reestablishing the flow of water into the tank when the pressure within reaches a predetermined minimum.

Having in view these objects and others which will be pointed out in the following description, I will now refer to the drawings, in which Figure 1 is a side view of the windmill regulator, portions being removed and other portions being sectioned in order to disclose interior parts, the view representing the position of the various parts when the wheel of the windmill is being drawn into inoperative position.

Figure 2 shows a portion of the mechanism shown in Figure 1, the parts indicating the positions which they occupy at low pressure when the wheel of the windmill is permitted to resume its operative position.

Figure 3 is a side view of the lever which is actuated by the pump rod, the lever and its co-operating parts being shown in the position when the pump and the windmill are in operation.

Figure 4 is a sectional view on the line 4—4 of Figure 1 in the position of high pressure.

Figure 6 is a view in perspective showing the pressure actuated lever for throwing the mill into and out of operation.

Figure 9 is an illustration in two parts of the dogs which actuate and hold the rack.

Figure 10 is a view in perspective showing a portion of the latching mechanism for the pressure controlled lever.

Figure 12 is a view in perspective of a washer.

Figure 8:
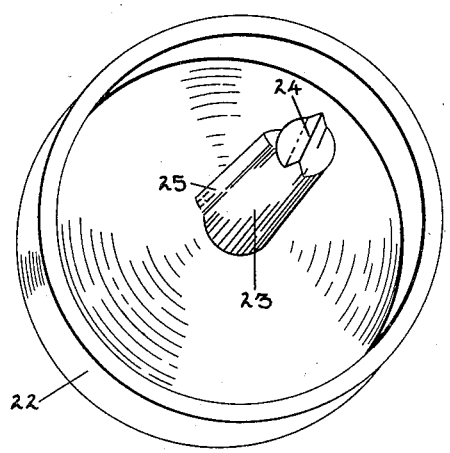
Figure 8 is a view in perspective of the piston with its stem for actuating the pressure controlled lever.

In Figure 1 the numeral 10 indicates a portion of the pump rod of the windmill while the numeral 11 indicates a portion of the pull-out wire of the windmill. The pump pit is also provided with some sort of support such as that shown at 12 and also with a pressure tube 13 which transmits the pressure of the pressure tank. These four parts in various forms are found in the pump pits of all pumps which are connected with a water pressure system. My regulator utilizes these four parts as supports and as actuating devices. My regulator is secured to a support 14 having a brace 15. The support 14 is secured to the pipe 12 by means of a suitable clamp 16. In the installation of the regulator in the pump pit it is essential that the proper position of the clamp 16 be determined relative to the pump rod 10 and to the pull-out wire 11. The rack 17 of my regulator must be in substantial alignment with the pull-out wire 11 to which it is secured by any suitable means such as that shown at 18. In addition I secure a stop member 19 to the pump rod 10 in such a position that it engages the pull-out lever on the upward stroke of the pump rod.

The regulator depends on the operation of a diaphragm for throwing the windmill into and out of operation. This diaphragm 20 is clamped between the upper and lower members of the casing 21 as shown in Figures 1 and 2. The lower casing member is provided with an aperture for receiving the open end of the pressure pipe 13. In the upper portion of the casing is a piston 22 which moves up and down in accordance with the movements of the diaphragm 20. This piston as shown in Figure 8 has a central stem or regulator operating member 23 terminating at its upper extremity in a hardened knife edge 24. The stem 23 also has a rib 25 for preventing the turning of the stem and the piston. The upper casing member is provided with a central aperture for receiving the stem in position to hold the knife edge in a position transverse to the lever 26. The lever 27 straddles the lever 26 and is pivotally connected to an upwardly projecting frame member having its base on the upper casing member. The lever 27 is provided in its bifurcated portion with a pair of aligned apertures 28 which are also in alignment with the cutaway portion 29 of the lever 26. The pin 30 passing through the two apertures 28 and through the cutaway portion 29 holds the levers 26 and 27 securely in relative position. The pin 30 also passes through apertures in fixed portions of the frame of the regulator so that the levers 26 and 27 in effect constitute a single lever of the bell crank type. It will be apparent that the upward and downward movements of the stem 23 will be communicated to the lever 26 to move its outer end upward or downward and these movements will also be communicated to the lever 27 whose upper end will thus be moved toward and away from the rack 17. It should be noted that the knife edge 24 is relatively close to the fulcrum 30 of the lever as shown in Figures 1 and 2. The result of this is that the movement of the lever at its point of contact with the knife edge 24 is magnified at the outer extremities of the levers 26 and 27 so that a relatively small movement at the point of contact with the knife edge results in a relatively large movement at the ends of the lever.

Figure 7:
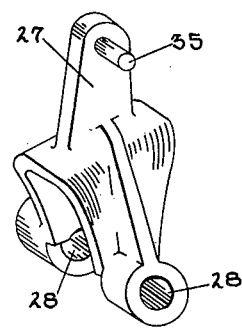
Figure 7 is an illustration showing the structure of the lever which is actuated by the pressure controlled lever.

The frame of the regulator includes two complementary plates of which the forward one has been removed from Figures 1 and 2 in order to clearly disclose the structures between the two plates. The rear plate is best shown at 31 in Figure 3. This plate 31 is provided with two parallel ribs 32 which support a slide 33. This slide moves in a horizontal direction and it is provided with two projecting vertical ribs 34. The lever 27 is provided with a pin 35 as shown in Figure 7 and this pin is adapted to seat within the space between the ribs 32 and 34. The ribs 32 have no function related to the pin 35 but the pin 35 acts on the ribs 34 to move the slide 33 in one direction or the other. The pin 35 has considerable play between the two ribs 34 so that the action of the lever 27 in either direction will result in a "slap" for moving the slide 33. The slide 33 also has a rib 36 which terminates in a knob or button 37. The purpose of these parts will be sebsequently explained but it is apparent that the movement of the lever 27 under the influence of the diaphragm 20 will cause the slide 33 to move toward and away from the rack 17.

Figure 5:
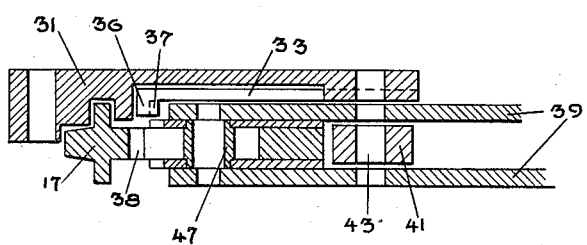
Figure 5 is a sectional view on the line 5—5 of Figure 1.

The rack 17 is ribbed on both sides as best shown in Figures 4 and 5. Both the front and rear frame members are provided with grooves for slidably receiving the rack 17 as shown with the rear frame member 31 in Figures 4 and 5. Particular attention is called to the shape of the serrations 38 of the rack 17. These are almost in the form of right angles with the longer edge directed inwardly and downwardly relative to the rack. They are so designed as to firmly hold the pawls when the regulator is in action and at the same time to readily release the pawls when it is desired to allow the wheel of the windmill to go back into the wind. The rack 17 has strictly a slidable up and down movement and it is prevented from either turning or from leaving its normal path in alignment with the pull-out wire 11.

Figure 11:
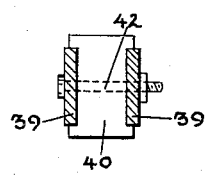
Figure 11 is a sectional view on the line 11—11 of Figure 1.

The lever 39 is designed for the purpose of actuating the rack for applying tension to the pull-out wire 11. For this reason the lever 39 will hereinafter be referred to as the pull-out lever. As shown in Figures 4, 5, and 11, this lever consists of two parallel bars which are connected in spaced apart relation by means of the spacing blocks 40 and 41. The block 40 is secured to the two lever bars 39 by means of a bolt 42 as shown in Figure 11. The block 41 is secured to the two lever bars 39 and also to the two frame members by means of a pivot bolt or the like at 43, the bolt passing through aligning apertures of all of these members. The rear bifurcated portion of the lever 39 straddles the pump rod 10 as shown in Figure 1. It is loose about the pump rod and its movement is controlled entirely by the stop 19. During the reciprocation of the pump rod 10 in the upward stroke of the pump rod, the rear or outer end of the lever 39 will move upwardly and it will be permitted to fall during the downward stroke of the pump rod 10.

At the opposite end of the lever 39 or at the extremity adjacent the rack 17 is a dog 44 between the two lever bars to which it is pivotally connected at 45. The construction of this dog is best shown in Figure 9 in which the parts of the dog are separated for the purpose of disclosing the structure. This consists of two parallel plates which are spaced apart by means of a weight 46 and also by means of a collar 47 which serves as a pivotal bearing for the dog. This dog carres a pawl 48 havng a pivot at 49. A stop 51 is also provided for limiting the movement of the pawl 48 in one direction and the spring 50 holds the pawl 48 yieldingly against the stop 51.
The up and down movements of the lever 39 following the reciprocation of the pump rod 10 will cause the pawl 48 to engage the teeth 38 of the rack 17 to force the rack downward. Because of this function the dog 44 will be referred to as the actuating dog to distinguish it from the holding dog 52. The dog 52 is similar in construction to the dog 44 but it is pivotally connected at 53 to the two opposite frame members of the regulator. Its pivotal point 53 is therefore stationary as distinguished from the pivot point 45 of the dog 44 which has an up and down arcuate movement in response to the movements of the pump rod 10. The dog 52 has a pawl 54 which is similar to the pawl 48 of the dog 44. The two pawls 48 and 54 are so arranged that when one of the pawls is seated within a notch of the rack, the other pawl will be in a midway position in another notch of the rack if the lever 39 is in horizontal position. The purpose of the pawl 48 is to depress the rack while the purpose of the pawl 54 is to hold the rack in depressed position until the pawl 48 is seated in the notch next above for the purpose of further depressing the rack 17.

The two dogs 44 and 52 with the pawls 48 and 54 are normally in the position indicated in Figure 1. They will remain in this position unless acted upon by some external means for releasing the two pawls from engagement with the rack. Such means are provided in the rib 36 of the slide

33. The rib 36 in its relation to the two dogs is shown in Figures 4 and 5. Referring again to Figure 9 it will be seen that one of the plates of the dog has its tip bent over to form an abutment 55. This abutment 55 lies in the path of the rib 36. When the parts are in the position shown in Figure 1 the rib 36 is in the position shown in Figure 5 and out of engagement with the dogs 44 and 52. When the slide 33 with its rib 36 is moved to its opposite position as shown in Figures 2 and 3, the rib will be in engagement with the abutments 55 to swing the two dogs on their pivots 45 and 53 and against the resistance of the weights. As before stated only one of the pawls 48 or 54 is seated within a notch of the rack at one and the same time. It is necessary, however, that the rib 36 swing both dogs at the same time so as to move them into position where engagement with the rack is impossible. The first effect of the action of the rib 36 on the dogs is to swing the dogs slightly upon their pivots and at the same time to swing the pawls through a very slight arc on their pivotal connections with the dogs. An inspection of Figure 1 will show that the pivotal connection 49 of the pawl is slightly out of alignment with the pivot 45 and the point of the pawl. In other words the various parts are very slightly over center. As the pawl 48 is swung slightly on its pivot 49 the three points mentioned will be in alignment or on center. A slight further movement will then cause the pawl 48 to snap back against the action of the spring 51 so as to cause no further resistance to the action of the rib 36 of the slide 33. The same movement takes place at the same time in the dog 52. Both dogs are then in the position indicated in Figure 2 with their pawls spaced from the rack and positively held spaced from the rack which is then permitted to slide upwardly to allow the wheel of the windmill to resume its operative position.

The movement indicated in Figure 1 continues until the pawl 48 is above the uppermost tooth of the rack 17. No further downward movement of the rack can take place after that as the pawl 54 is merely a holding pawl to prevent upward movement of the rack. At this point the windmill is entirely out of operation so that normally no further movement of the lever 39 takes place. The arrangement of my regulator is such that the lever 39 will be held in inoperative position when the slide 33 is in the position shown in Figures 2 and 3. The button or knob 37 as shown in Figure 3 will engage the end of the lever 39 to hold it in its uppermost position against pivotal movement. The result of this action is that when the pressure is low and therefore the windmill is in normal operation, the lever 39 will be held up out of the way of the stop 19. The actuation of the lever 39 is not necessary except while the mill is actually being pulled out of gear. When the lever 26 is down the mill is allowed to go into gear, the pump rod will start moving up and down and the stop 19 will lift the lever 39 to the position shown in Figure 2 where it will be held by the button 37 until the pressure rises. A rise in pressure causes the lever 26 to rise and the button 37 to release the lever 39. At the same time the pawls or dogs are caused to engage the rack and the lever 39 will follow the movements of the pump rod, soon pulling the mill out of gear.

It is necessary for the successful operation of a pressure controlled windmill regulator that the movements of the slide 33 be very rapid in order that the dogs will be either fully engaged with the rack or fully disengaged and in order to overcome the tension on the pull-out wire 11, which is considerable, resulting in great binding action between one or the other of the pawls 48 or 54 with the rack. A greater force is therefore required to move the slide 33 against the dogs to withdraw the pawls from the rack. For this purpose I provide a spring mechanism connected with the lever 26. The spring 56 is secured to a rod 57 which is connected through a yoke 58 and a pivot pin 59 with the lever 26 as shown in Figures 1 and 2. The lower end of this rod is provided with a washer and with a wing nut 60 for adjusting the tension of the spring 56. The upper extremity of the spring 56 bears against the lower wall of the latching lever 61 which is pivotally connected at 62 with the frame of the regulator. The structure of the latching lever 61 is best shown in Figure 10, the latching lever being provided with an aperture 63 for the reception of the rod 57. As best shown in Figure 6 the lever 26 has a pin 64 projecting on both sides thereof. The latching lever 61 has a pair of discs 65 projecting slightly beyond the straight edges of the lever. This pin seats in the angle formed by the straight edges of the latching lever 61 and the exposed curved edges of the disc 65 as best shown in Figures 1 and 2. The action of these parts is such that no up and down movement of the lever 26 will take place until sufficient force is stored up either in the spring or in the diaphragm to cause the lever to move very rapidly after it does start. As before explained the pin 35 has considerable play in the space between the two ribs 34 and in consequence the latter half of the movement of the lever 26 is transmitted suddenly against one of the ribs 34. The same thing is true in the reverse movement and the concentration of the force exerted against the ribs 34 is such as to overcome the resistance of the various parts and especially the resistance of the pawls in their binding action against the rack.

The pressure regulator is automatic in both directions. It lets the wind wheel into the wind whenever the pressure falls below a predetermined point and it pulls the wind wheel out of operative position as soon as the pressure has been raised to the required point. The spring 56 counterbalances the pressure of the diaphragm 20 and it is obvious that a change in tension of the spring 56 will raise or lower the pressure required to move the lever 39 and the dogs into operative position. It is thus possible to adjust the tension of the spring 56 through the thumb nut 60 for a wide variation in the pressures within the pressure tank and connections. The present windmill regulator is so built that adjustment for top pressures may be made within the limits of thirty-five to fifty pounds but these limits may be altered by slight changes in the construction. Likewise the present regulator is so designed that the pressure at which the windmill goes back into the wind will be from fifteen to twenty pounds lower than the top pressure.

The stroke of the pump rod 10 varies between wide limits in the various windmills. It is therefore necessary in attaching the stop member 19 to select a point in the pump rod at which the stroke will carry the free end of the lever 39 upwardly the required distance. The movement of the pump rod will then be idle as far as the regulator is concerned throughout the first portion of the upward stroke of the pump rod but the stop 19 will engage the lever 29 to lift the lever the required distance. On the downward stroke of the pump rod the lever 39 is practically disengaged from the pump rod so that the lever 39 is permitted to resume the position with its outer end at its lowermost point.

Having thus described my invention in such full, clear, and exact terms that its construction and operation will be readily understood by others skilled in the art to which it pertains, what I claim as new and desire to secure by Letters Patent of the United States is:

1. A device for automatically operating the pullout mechanism of a windmill of the kind having a pump rod, said device including a rack adapted for attachment to the pullout of the windmill, a rocking lever for attachment to the pump rod of the windmill, a dog pivotally secured to said lever, a pawl pivotally secured to said dog, the pivot of said pawl being over center with respect to the pivot of said dog and the rack engaging extremity of said pawl, and means for rocking the pivot of said pawl across center to cause the dis-engagement of said pawl from said rack.

2. A device for operating the pullout of a windmill of the kind having a pump rod, said device including a rack adapted for attachment to the pullout of the windmill, a rocking lever for attachment to the pump rod of the windmill, a dog having a pivotal connection with said lever, a pawl having a pivotal connection with said dog and adapted for engagement with said rack with the pivotal connection thereof slightly over center with respect to the pivotal axis of said dog and the outer extremity of said pawl, and means for rocking said dog over center to first collapse said pawl and dog and to thereby disengage said pawl from said rack.

3. A device for automatically operating the pullout mechanism of a windmill of the kind having a pump rod, said device including a rack adapted for attachment to the pullout of the windmill, the notches in said rack having downwardly and inwardly gradually inclined upper edges and downwardly and outwardly abruptly inclined lower edges, a rocking lever for attachment to the pump rod of the windmill, a dog pivotally secured to said lever, a pawl pivotally secured to said dog, a slide engaging the pivot of said pawl for causing the movement of said pawl toward or away from said rack, and impact means for driving said slide toward or away from said rack.

4. A device for automatically operating the pullout mechanism of a windmill of the kind having a pump rod, said device including a rack adapted for attachment to the pullout of the windmill, a rocking lever for attachment to the pump rod of the windmill, a dog pivotally secured to said lever, a pawl pivotally secured to said dog, a slide engaging said dog for causing the movement of said pawl toward or away from said rack, and an impact device for moving said slide to cause either the engagement or disengagement of said pawl with said rack.

5. A device adapted to control within maximum and minimum limits the pressure within a closed receptacle containing air and water and having a windmill operated pump for forcing water into the receptacle, said device including a diaphragm responsive to variations in pressure within the receptacle, a rack adapted to be secured to the pullout of the windmill, a lever operable by the pump rod of the windmill, said lever having an actuating pawl pivotally secured thereto for engagement or disengagement with said rack whereby downward movement is imparted by the pump rod of the windmill to said rack when said pawl is in engagement therewith, a slide for moving said pawl into or out of engagement with said rack, an amplifying lever actuated by said diaphragm for imparting amplified movement to said slide, means connected with said amplifying lever for storing up the energy of the compressed air in said receptacle, means for suddenly releasing the stored up energy into said amplifying lever, and a lost motion connection between said amplifying lever and said slide for imparting an impact to said slide when the stored up energy is released.

6. A device adapted to control within maximum and minimum limits the pressure within a closed receptacle containing air and water and having a windmill operated pump for forcing water into the receptacle, said device including a diaphragm responsive to variations in pressure within the receptacle, a rack adapted to be secured to the pullout of the windmill, a lever operable by the pump rod of the windmill, said lever having an actuating pawl pivotally secured thereto for engagement or disengagement with said rack whereby downward movement is imparted by the pump rod of the windmill to said rack when said pawl is in engagement therewith, means for causing said pawl to engage or disengage said rack, an amplifying bell lever actuated by said diaphragm for imparting amplified movement to actuate said means, a snap action device for storing up the energy of the compressed air and for suddenly releasing the stored up energy into said amplifying lever, and a loose connection between said amplifying lever and said means for imparting a hammer blow to said means when the stored up energy is suddenly released.

7. A device for automatically operating the pullout of a windmill having a pump rod and means for building up pressure comprising a rack secured to the pullout of the windmill, a casing connected with the pressure means, a diaphragm within said casing, a lever operable by the pump rod of the windmill, said lever having an actuating pawl pivotally secured thereto for engagement or disengagement with said rack whereby downward movement is imparted by the pump rod of the windmill to said rack when said pawl is in engagement therewith, a slide for moving said pawl into or out of engagement with said rack, an amplifying lever actuated by said diaphragm for imparting amplified movement to said slide, means connected with said amplifying lever for storing up the energy of the compressed air in said receptacle, means for suddenly releasing the stored up energy into said amplifying lever, and a lost motion connection between said amplifying lever and said slide for imparting an impact to said slide when the stored up energy is released, said levers, said slide, said storing and releasing means and said lost motion connection being secured to said casing and supported thereby.

8. A device for automatically operating the pullout of a windmill having a pump rod and means for building up pressure comprising a rack secured to the pullout of the windmill, a casing connected with the pressure means, a diaphragm within said casing, a lever operable by the pump rod of the windmill, said lever having an actuating pawl pivotally secured thereto for engagement or disengagement with said rack whereby downward movement is imparted by the pump rod of the windmill to said rack when said pawl is in engagement therewith, means for causing said pawl to engage or disengage said rack, an amplifying bell lever actuated by said diaphragm for imparting amplified movement to actuate said means, a snap action device for storing up the energy of the compressed air and for suddenly releasing the stored up energy into said amplifying lever, and a loose connection between said amplifying lever and said means for imparting a hammer blow to said means when the stored up energy is suddenly released, said levers, said pawl engaging and disengaging means, said snap action device and said loose connection being secured to said casing and supported thereby.

9. A device for operating the pullout of a windmill of the kind having a pump rod, said device including a rack adapted for attachment to the pullout of the windmill, the notches in said rack having downwardly and inwardly gradually inclined upper edges and downwardly and outwardly abruptly incline lower edges, a rocking lever for attachment to the pump rod of the windmill, a dog having a pivotal connection with said lever, a pawl having a pivotal connection iwth said dog and adapted for engagement with said rack with the pivotal connection thereof slightly over center towards the rack with respect to the pivotal axis of said dog and the outer extremity of said pawl, and means for rocking said dog over center to first collapse said pawl and dog and to thereby disengage said pawl from said rack.

HENRY SCHLACHTER.